No. 643,429. Patented Feb. 13, 1900.
A. A. WADE.
PNEUMATIC TIRE.
(Application filed Oct. 4, 1897.)
(No Model.)
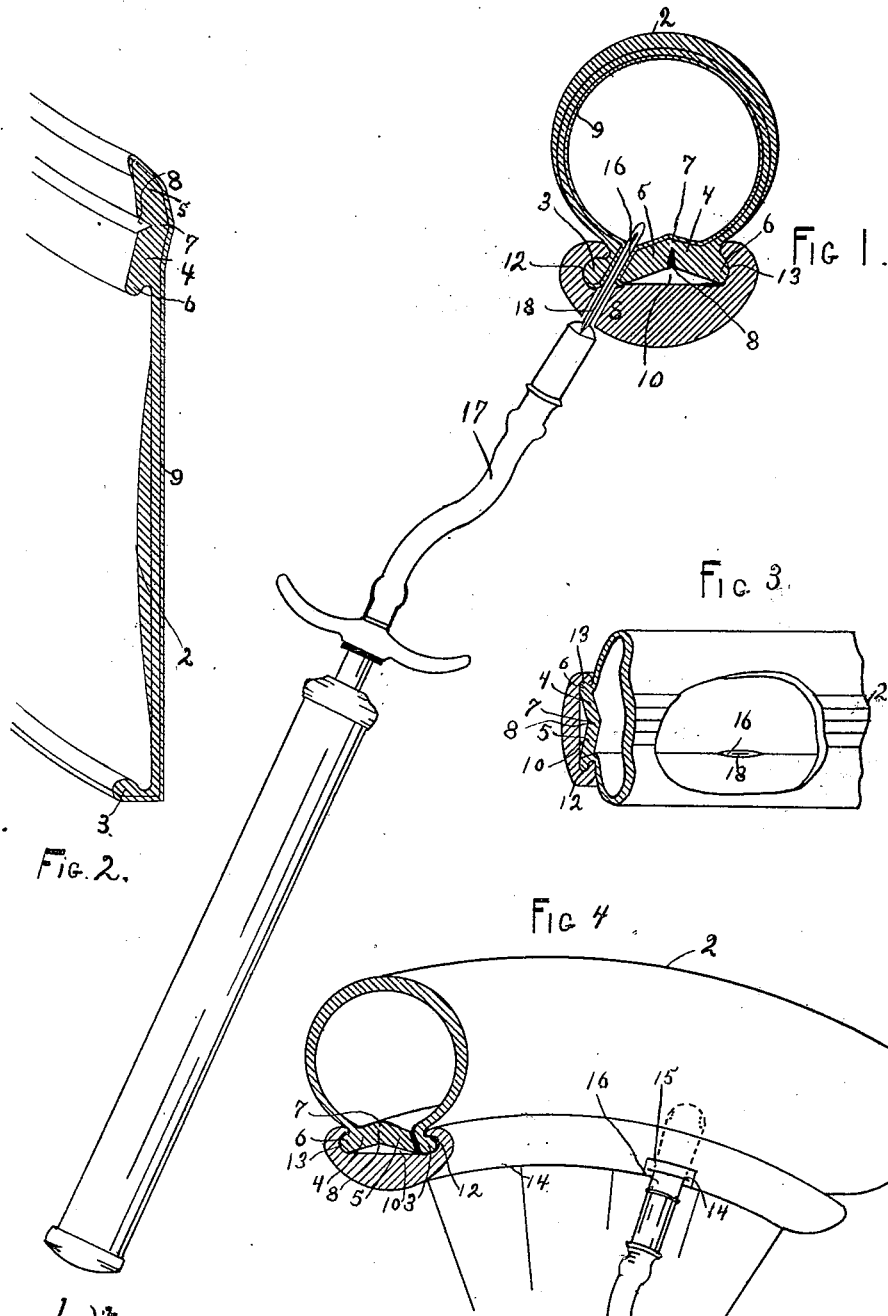

UNITED STATES PATENT OFFICE.

ALBERT A. WADE, OF MONTICELLO, MINNESOTA.

PNEUMATIC TIRE.

SPECIFICATION forming part of Letters Patent No. 643,429, dated February 13, 1900.

Application filed October 4, 1897. Serial No. 654,079. (No model.)

*To all whom it may concern:*

Be it known that I, ALBERT ABRAM WADE, of the city of Monticello, county of Wright, State of Minnesota, have invented certain new and useful Improvements in Pneumatic Tires and Means for Inflating the Same, of which the following is a specification.

My invention relates to improvements in pneumatic tires for bicycles, and particularly to that class of tires which are known as "self-locking single-tube tires," that are secured in place, not by cement, but by expansion or inflation, being thus forced into strong engagement with a suitably-formed wheel-rim.

The object of the invention is to provide a bicycle-tire which, when desired, may be opened flat to admit of its being easily and quickly repaired and which, being placed on the wheel, will be made air-tight by inflation.

A particular object of the invention is to make use of the principle of the toggle-joint in compressing or forcing together the edges of the tire to prevent leakage of the air at the joint.

Another object of the invention is to provide an inflating device or injector particularly adapted for employment with such tires.

The invention consists generally in the combination of a grooved wheel-rim with a belt-like tire having beads or ribs at its edges to enter the grooves of said rim, and one edge of the tire being provided with a toggle-joint portion that being straightened by pressure forces the said beads into said grooves and so firmly presses together the edges of the tire that the escape of air is prevented.

The invention further consists in a thin flat nozzle or injector adapted to be inserted between the meeting edges of the tire while the same is in place upon the rim, said injector being preferably largest at the outer end to prevent the expulsion thereof by the air-pressure from within the tire or the leaking of air around the nozzle while the tire is being inflated; and the invention further consists in various constructions and in combinations of parts, all as hereinafter described, and particularly pointed out in the claims.

The invention will be more readily understood by reference to the accompanying drawings, forming part of this specification, and in which—

Figure 1 is a sectional view of a wheel rim and tire embodying my invention and also shows a pump and the novel injector or nozzle. Fig. 2 is a cross-section of the tire when flat, as it is before being placed on a wheel. Fig. 3 is a detail section of the tire and rim, the tread of the tire being broken away to show the point or end of the nozzle projecting into the tire. Fig. 4 is a perspective view of a wheel-rim, the tire, and the injector or nozzle.

As shown in the drawings, 2 represents the tread portion of the tire. At one edge of the tread portion is the rib or bead 3 and at the other edge is the toggle-joint portion, made up of the parts 4 and 5, the part 4 being preferably provided with a bead or rib 6. The parts 4 and 5 are joined by the solid portion 7 in the upper parts thereof, but are otherwise separated by a groove or cut 8 in the under side. The tread proper may be strengthened or thickened in any manner, and I preferably line the inside of the tire with thin soft sheet-rubber 9, which extends from the rib 3 to the extreme edge of the toggle-joint portion. These parts make up the endless belt. When the tire is placed upon the wheel, the edges are folded inward, with the inner surface of the rubber portion 3 pressed upon by the edge 11 of the part 5, thus making a tubular tire. The rim of the wheel is provided with the straight-bottomed recess 10 and with the grooves 12 and 13 to receive the raised edges or beads 3 and 6 on the opposite edges of the tire. The ribbed edge 3 is first placed in its groove, and the toggle-joint portions 4 and 5 are then doubled into place, with the edge 11 of the toggle-joint portion pressed against the ribbed part 3, and the bead or rib 6 is forced down into the rim and the groove 13 therein. Now as air is forced into the tire the walls thereof will be expanded and the toggle parts 4 and 5 will be pressed down, perhaps to the flat bottom of the recess or groove in the rim, said parts 4 and 5 pivoting on the connecting part 7. The parts 4 and 5 are made of substantially solid rubber or other material and are but slightly compressible. Therefore as the same are depressed nearly to or quite into the same plane the meeting edges of the parts 3 and 5 will be forced so strongly into engagement as to make an airtight joint between them and effectually prevent the escape of air.

It would be difficult, though not wholly impracticable, to provide a permanent valve-tube or nipple in the tire, as such a valve device would render the placing of the tire or the removal of the same difficult. I therefore prefer to use a separable nozzle or injector, which may be entered at any point along the seam or joint between the two edges of the tire. The rim may be provided with one or more injector-receiving holes 14, that may be closed by small plates or by the pieces 15 of rubber to prevent the lodgment of dirt therein. The nozzle or injector 16 has the thin flat form shown in Figs. 1, 3, and 4. The same is preferably made of metal and is placed upon the end of the pump-tube or joint 17. It is provided with a small duct 18, (indicated in Figs. 1 and 3,) and this duct opens, preferably, at the sides of the end of the nozzle. The nozzle is easily inserted between the snugly-pressed edges of the tire and as easily withdrawn therefrom. The cross-section of the nozzle is substantially as indicated in Fig. 3, the edges being quite sharp, so that the edges of the tire will press upon and close tightly around the same. To further prevent the escape of air about the nozzle, I prefer to make the outer end thereof larger than the inner end—that is, thicker and wider than the other parts of the nozzle—so that the air-pressure will tend to wedge the nozzle between the parts of the tire rather than to expel the same or to allow the air to leak out around the nozzle or injector. I prefer that the groove for the rib 3 shall be deeper than the opposite groove in the rim, but this is not essential to my invention.

The main advantages of my invention result from the employment of the rigid toggle-joint parts 4 and 5, adapted to be pressed or firmly projected to force the ribs into the rim-grooves and tightly close the joint between the edges of the tire, the effective pressure of the toggle being greater than that of the air within the tire.

As the invention admits of modifications both in the tire and the injector therefor, I do not confine the invention to the specific construction herein shown and described.

Having thus described my invention, I claim as new and desire to secure by Letters Patent—

1. The combination, in a single-tube tire, of a tread portion provided with the rib or bead on one edge and having a rib or bead and a two-part toggle portion upon its other edge, said toggle portion comprising connected and comparatively rigid straight parts, and the wheel-rim provided with grooves for the beads of the tire and for the toggle portion thereof, the free edge of the toggle portion being engaged with the opposite edge portion of the tire, and the joint between said parts being closed by the action of said toggle portion under pressure, substantially as described.

2. The bicycle-tire, comprising the tread portion 2, provided upon one edge with the rib or bead 3 and upon the other edge with the rib or bead 6 and the connected toggle portions 4 and 5, said portions 4 and 5 being partially separated by the groove or cut 8 in the under or outer side, substantially as described.

3. The combination, with the wheel-rim provided with the grooves 12 and 13 and with one or more holes 14, of the tire comprising the tread portion having on one edge a rib or bead 3 to enter said groove 12 in the rim, and having upon the other edge a bead or rib 6 to enter the opposite groove in the rim, and the toggle portions 4 and 5 connected in their upper or inner parts and partially separated by the groove or cut 8, and the thin and flat injector or nozzle adapted to be inserted in the hole 14 in the rim and between the abutting edges of the tire, substantially as described.

4. The tire, comprising the tread portion 2, the ribbed edge 3, the ribbed edge 6, the toggle parts 4 and 5 separated by the V-groove 8 in the outer side, and the lining 9 of thin, soft rubber, substantially as described.

ALBERT A. WADE.

Witnesses:
HENRY PENNINGTON,
GEORGE DOEHNE, Jr.